United States Patent
Khoshgard et al.

(10) Patent No.: US 9,225,574 B2
(45) Date of Patent: Dec. 29, 2015

(54) SYNCHRONIZATION AND ACQUISITION IN RADIO COMMUNICATION SYSTEMS

(71) Applicant: SiTune Corporation, San Jose, CA (US)

(72) Inventors: Mahdi Khoshgard, Los Gatos, CA (US); Marzieh Veyseh, Los Altos, CA (US); Vahid Mesgarpour Toosi, Mountain View, CA (US)

(73) Assignee: SITUNE CORPORATION, San Jose, CA (US)

( * ) Notice: Subject to any disclaimer, the term of this patent is extended or adjusted under 35 U.S.C. 154(b) by 0 days.

(21) Appl. No.: 14/106,695

(22) Filed: Dec. 13, 2013

(65) Prior Publication Data

US 2015/0172086 A1    Jun. 18, 2015

(51) Int. Cl.
*H04L 27/28* (2006.01)
*H04L 27/26* (2006.01)

(52) U.S. Cl.
CPC .................................. *H04L 27/2646* (2013.01)

(58) Field of Classification Search
CPC ............ H04L 27/2656; H04L 27/2657; H04L 27/2675; H04L 27/2679; H04L 2027/003; H04L 2027/0059; H04L 2027/0067; H04L 27/2646
See application file for complete search history.

(56) References Cited

U.S. PATENT DOCUMENTS

| | | | |
|---|---|---|---|
| 2004/0008802 A1* | 1/2004 | Galperin et al. ............... | 375/343 |
| 2006/0153317 A1* | 7/2006 | Zhang et al. ................... | 375/344 |
| 2007/0064821 A1* | 3/2007 | Chen et al. ..................... | 375/260 |
| 2008/0279221 A1* | 11/2008 | Wen et al. ...................... | 370/500 |
| 2011/0019101 A1* | 1/2011 | Goto et al. ..................... | 348/725 |
| 2011/0135036 A1* | 6/2011 | Andgart et al. ................ | 375/316 |
| 2013/0148765 A1* | 6/2013 | Dubey et al. ................... | 375/343 |

* cited by examiner

*Primary Examiner* — Syed Haider
(74) *Attorney, Agent, or Firm* — Novak Druce Connolly Bove + Quigg LLP

(57) ABSTRACT

Systems and methods are described for synchronizing a receiver to a received signal and other signal processing approaches and/or components associated with the receiver. For example, a signal (e.g., a radio frequency (RF) signal such as a broadband TV signal in UHF and VHF frequencies) can be received at a receiver. Before the signal is provided to other components of the receiver, the signal can be processed in a component of the receiver commonly known as the digital front-end, where such processing can include amongst others, various synchronization and acquisition techniques.

20 Claims, 11 Drawing Sheets

SYNCHRONIZATION AND ACQUISITION IN RADIO COMMUNICATION SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to radio communication, and more particularly, to receiver synchronization and acquisition.

BACKGROUND

In the age of rapid innovations in the field of telecommunications, the requirements for communication devices that enable faster, cheaper and more reliable data transfer is escalating. The receiver is a determining component in a communication device's performance and cost. The receiver's function is to receive an often distorted and attenuated signal and convert the signal into a signal that can be used by other components in the system. The quality of the signals produced by the receiver is a limiting factor in the performance of communication systems and manufactures of such systems strive to improve at least this aspect of the receiver design. In conventional communication systems, a transmitter communicates with a receiver over a communication channel. The transmitter modulates an original signal to create a carrier signal oscillating at a unique frequency that can be received at a receiver. Generally, before information contained in the signal can be used by the receiver, the receiver is synchronized in time and frequency with the received signal in order to correctly parse the signal from other signals or noise. For example, due to propagation delays, frequency shifts, multipath deflection, etc., a receiver often times needs to align ("tune") its acquisition of the transmitted signal to account for these various offsets.

Accordingly, in many communication systems, at the start of each communication, a preamble or "acquisition sequence" may be transmitted from a transmitting device such that any interested receiver may detect the transmission and synchronize to it. For instance, these acquisition sequences may be generally known communication signal structures that facilitate waveform acquisition processing through unique timing and frequency properties. The remainder of the transmitted data (e.g., the payload) may then be transmitted and received based on the synchronization, with optional "pilot" sequences dispersed throughout the payload to ensure that the transmitter and receiver remain synchronized (e.g., due to environmental changes, movement of the devices, etc.). However, some communication systems may have difficulty in the acquisition and synchronization of signals or lack robustness and/or flexibility for the purpose of signal processing.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for wireless and/or wired communication. In particular, various embodiments describe systems and methods for synchronizing a receiver to a received signal and other signal processing approaches and/or components associated with the receiver. For example, in accordance with various embodiments, a signal (e.g., a radio frequency (RF) signal such as a broadband TV signal in UHF and VHF frequencies) can be received at a receiver. Before the signal is provided to other components of the receiver, the signal can be processed in a component of the receiver commonly known as the digital front-end, where such processing can include amongst others, various synchronization and acquisition techniques. Various other applications, processes, and uses are presented below with respect to the various embodiments.

Figure 1:
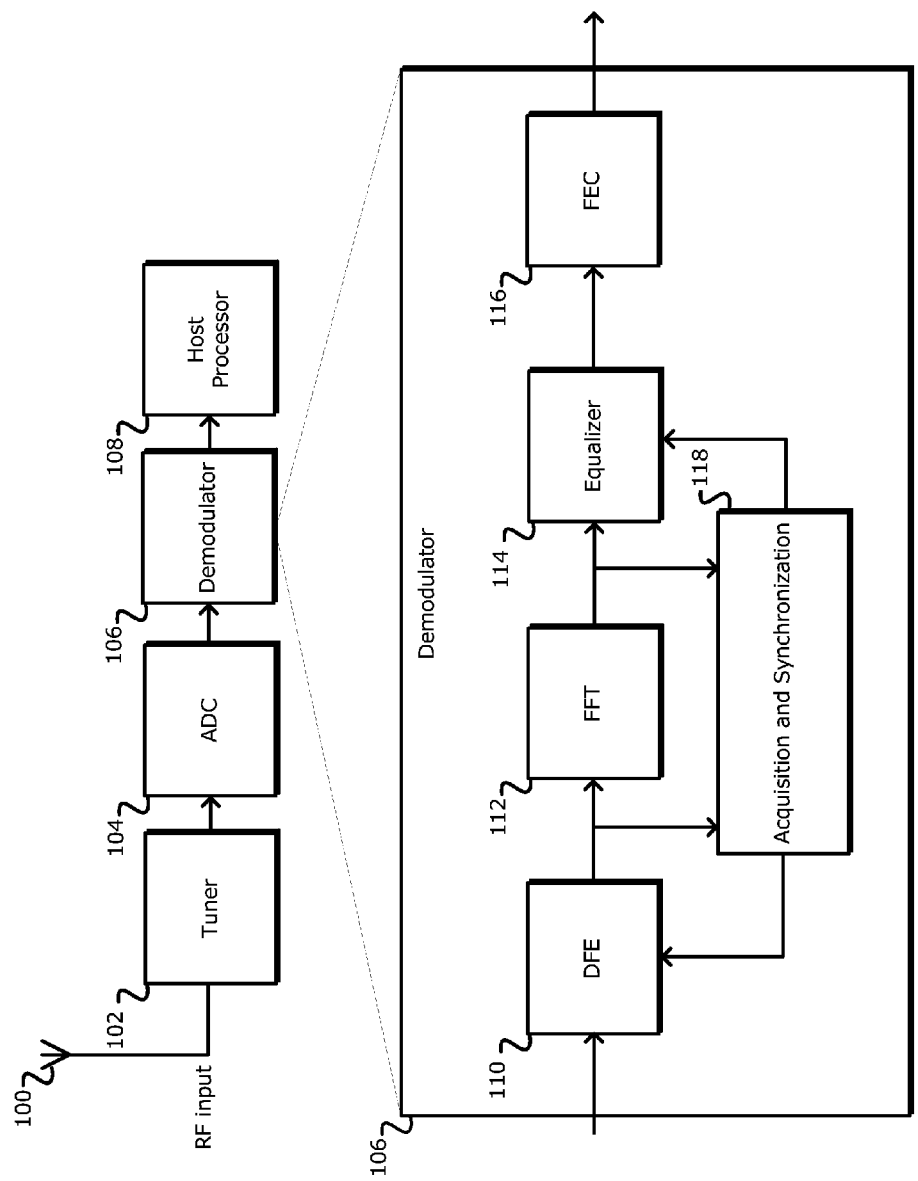
FIG. 1 illustrates an example block diagram of a receiver, in accordance with various embodiments.

FIG. 1 illustrates an example block diagram of a receiver, in accordance with various embodiments. As shown in FIG. 1, the receiver includes, for example, a tuner 102, an analog-to-digital converter (ADC) 104, a demodulator 106, and a host processor 108. The demodulator can include, for example, a digital front-end (DFE) component 110, a Fast Fourier Transform (FFT) component 112, an acquisition and synchronization component 118, an equalizer 114, and a forward error correction (FEC) decoder 116. In this example, a transmitter can communicate with the receiver. The transmitter can, for example, modulate an original signal to create a carrier signal oscillating at a unique frequency. The carrier signal's unique frequency can define its channel in the system.

In accordance with various embodiments, the signal can include several sections or portions. For example, the signal can include, two preambles or pilot symbols, first preamble (e.g., P1) and second preamble (e.g., P2), and a data portion (e.g., data symbols). P1 symbol can be a pilot symbol that carries signaling fields which contains information about basic system transmission parameters like FFT size and is located in the beginning of the frame within each RF-channel. In various embodiments, the P1 symbol is used for fast initial band scan to detect the T2 signal, its timing, frequency offset, and FFT-size. P1 symbol can be a 1K P1 orthogonal frequency-division multiplexing (OFDM) symbol with two ½ "guard interval-like" portions added. The total symbol lasts 224 μs in 8 MHz system, comprising 112 μs, the duration of the useful part 'A' of the symbol plus two modified 'guard-interval' sections 'C' and 'B' of roughly 59 μs (542 samples) and 53 μs (482 samples). P2 can be a pilot symbol located right after P1 with the same FFT-size and guard interval as the data symbols. The number of P2 symbols can depends on the FFT-size. The P2 symbols are used for fine frequency and timing synchronization as well as for initial channel estimate. P2 symbols carry L1 and L2 signaling information and may also carry data. In accordance with various embodiments, layer 1 (L1) signaling provides the receiver with a means to access physical layer pipes within T2-frames. According to the DVB-T2 standard, T2-base signal uses the T2-base profile, T2-frame is a fixed physical layer TDM frame that is further divided into variable size sub-slices. T2-frame starts with one P1 and one or multiple P2 symbols, T2-Lite signal uses the T2-Lite profile, T2 profile is a subset of all configurations allowed by the present document, T2 signal consists of the waveform using a particular profile of the present document (T2-base profile or T2-Lite profile), including any FEF parts.

In various embodiments, at least purpose of the P1 signaling, which is carried by the P1 symbol, can be to indicate the transmission type and basic transmission parameters. The remaining signaling can be carried by the P2 symbol(s), which may also carry data. The L1-pre signaling enables the reception and decoding of the L1-post signaling, which in turn can convey the parameters needed by the receiver to access the physical layer pipes. In various embodiments, the P1 symbol has the capability to convey 7 bits for signaling. Since the preamble (both P1 and P2 symbols) may have different formats, the main use of the P1 signaling is to identify the preamble itself. The information it carries is of two types: the first type (associated to the S1 bits of the P1) can be used to distinguish the preamble format (and, hence, the frame type); the second type helps the receiver to rapidly characterize the basic TX parameters. The preamble format is carried in the S1 field of the P1 symbol. It identifies the format of the P2 symbol(s) that take part of the preamble. The first 3 bits of the S2 field are referred to as S2 field 1. When the preamble format is of the type T2_SISO, T2_MISO, T2-LITE_SISO or T2-LITE_MISO, S2 field 1 indicates the FFT size and gives partial information about the guard interval for the remaining symbols in the T2-frame.

A receiver can receive the carrier signal from an antenna 100 or through a direct wired connection. The signal can be provided to the tuner 102, where the signal can be amplified, filtered, and/or down-converted, for example to a baseband or intermediate frequency (IF). After the tuner, the signal can be provided to the ADC 104 for analog to digital conversion. Before information contained in the carrier signal can be used, the carrier signal must be demodulated, for example, to produce a signal that can be used by other components of the device to carry out the device's functions. Accordingly, the signal can then be provided to the demodulator 106 to extract the original information-being signal from the modulated signal and to the host processor 108 for further processing.

As described, the demodulator 106 can include, for example, a DFE component, a FFT component, an acquisition and synchronization component, an equalizer, and a forward error correction (FEC) decoder. The DFE component can include components that process the original incoming signal from the tuner after the ADC, as will be described further herein. The signal from the DFE can be provided to the FFT component 112. The acquisition and synchronization component can compensate for time-varying channel effects (e.g., channel distortions), sampling frequency offset errors, and/or carrier frequency offset errors, and compensation values can be provided to the DFE and equalizer. The equalizer can compensate for undesirable effects on received signals introduced by either signal processing or by the transmission medium. For example, the equalizer can multiple the received signal after transformation into the frequency domain with a corrective signal that compensates for these effects. Thereafter, the equalized signal enters the forward error correction (FEC) or channel coding component to decode the signal and control errors in data transmission over unreliable or noisy communication channels.

Figure 2:
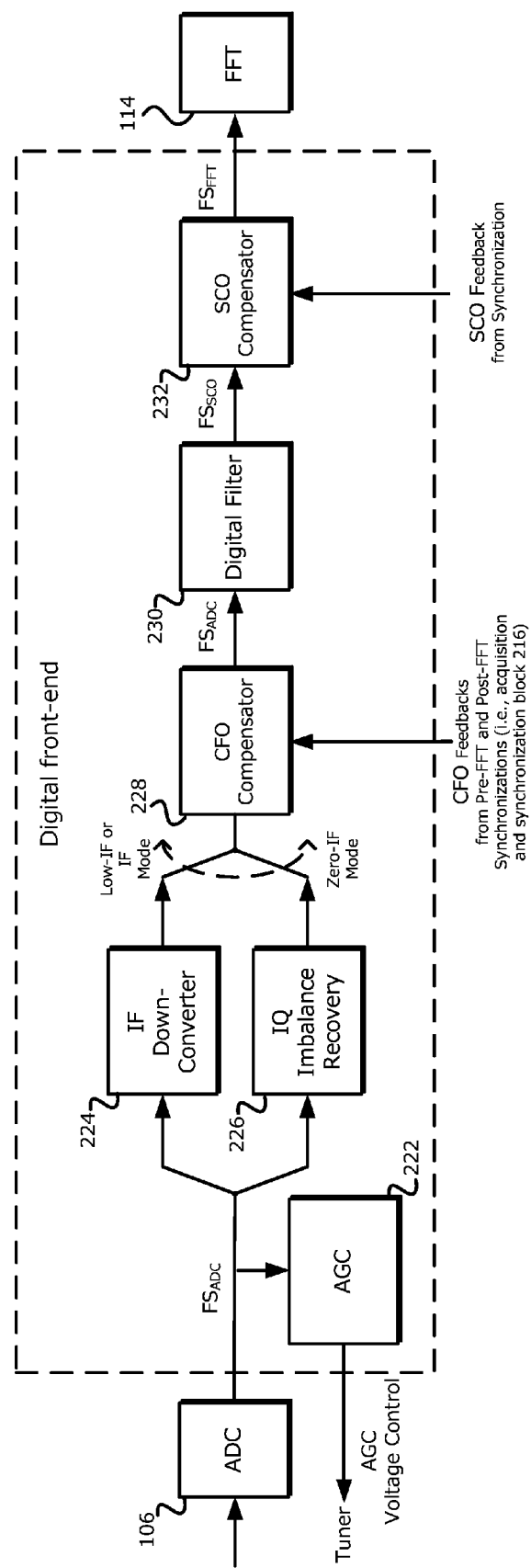
FIG. 2 illustrates an example block diagram of a digital front-end component of a receiver in accordance with various embodiments.

FIG. 2 illustrates an example block diagram of a digital front-end (e.g., digital front-end 110 of FIG. 1) of a demodulator (e.g., demodulator 106 of FIG. 1), in accordance with various embodiments. As shown in FIG. 2, the output signal of the ADC (i.e., $FS_{ADC}$) can be an input to an automatic gain control (AGC) 222, an intermediate frequency (IF) down-converter component 224, and an in-phase quadrature (IQ) imbalance recovery component 226. The sampling frequency of $FS_{ADC}$ can be zero-IF (e.g., baseband), low-IF (e.g., 4 MHz-7 MHz), or high IF (e.g., 36 MH-55 MHz). In accordance with various embodiments, a higher IF can be converted to a desired low-IF by selecting an appropriate sampling clock for the ADC.

The output signal of the DFE (i.e., $FS_{FFT}$) is an input to the FFT component (e.g., FFT component 112 of FIG. 1). The sampling frequency of $FS_{FFT}$ can be, for example, a standard sampling rate, wherein the DFE can convert the sampling rate of the ADC to the standard sampling rate. For example, for an 8 MHz channel bandwidth, a standard sampling rate can be 64/7 MHz. It should be noted that other sampling rates are possible and the illustrated sampling rate is being provided for illustration purposes only. Other sampling rates can be used as would be understood to one skilled in the art.

In accordance with various embodiments, the AGC component 222 can adjust the tuner gain. For example, the AGC can provide an AGC voltage control to the tuner, where the AGC voltage control can cause the tuner to set the ADC input signal level at the dynamic range of the ADC for optimal performance. In accordance with various embodiments, in the situation where the sampling frequency of $FS_{ADC}$ is low-IF or high-IF, the IF down-converter component can convert the IF signal to zero-IF signal. In this case, the IQ imbalance compensator is not needed because the digital mixer should not have an IQ mismatch. In the situation where the sampling frequency of $FS_{ADC}$ is zero-IF, the IQ imbalance compensator component can estimate and compensate the IQ mismatch in the IQ path of tuner.

The carrier frequency offset (CFO) compensator component 228 can be a digital mixer that can be implemented by, for example, a coordinate rotation digital computer (CORDIC) algorithm. The output of the CFO compensator is $FS_{ADC}$. The CFO compensator receives feedback from pre-FFT and post-FFT synchronizations from an acquisition and synchronization component, such as acquisition and synchronization component 216 of FIG. 2. The pre-FFT and post-FFT input from the acquisition and synchronization component can be a result of at least a "fine CFO fractional estimation" algorithm, a "fine CFO integer estimation algorithm", and a "CFO tracking algorithm" of the acquisition and synchronization component 216.

Digital filter 230, after CFO compensator, can have at least two main applications. A first application can include filtering the remaining adjacent channel signal from analog filters. A second application can include adjusting the sampling rate with an interpolation rate of "L". Accordingly, the sampling rate at the output of digital filter (e.g., $FS_{SCO}$), which is the input of sampling clock offset (SCO) compensator, is "L" times the sampling rate of ADC.

The SCO compensator component is a time-variant interpolator that can compensate the error caused by sampling error between ADC in the receiver and DAC in the transmitter. In accordance with various embodiments, the SCO compensator can be a linear time-variant interpolator. In some embodiments, increasing the sampling rate at the input of the SCO (i.e., $FS_{SCO}$) can increase performance of the SCO compensator. This can be done by choosing an oversampled rate for the ADC and having an interpolation rate in the digital filter. In accordance with various embodiments, the SCO compensator can have an inherent down-sampling rate of "M". Accordingly, the overall sampling rate conversion in the DFE is "L/M". In various embodiments, to provide a sampling rate of $FS_{FFT}$ at the FFT input, the ADC can have a sampling rate of "$FS_{ADC}=M/L \times FS_{FFT}$".

Figure 3:
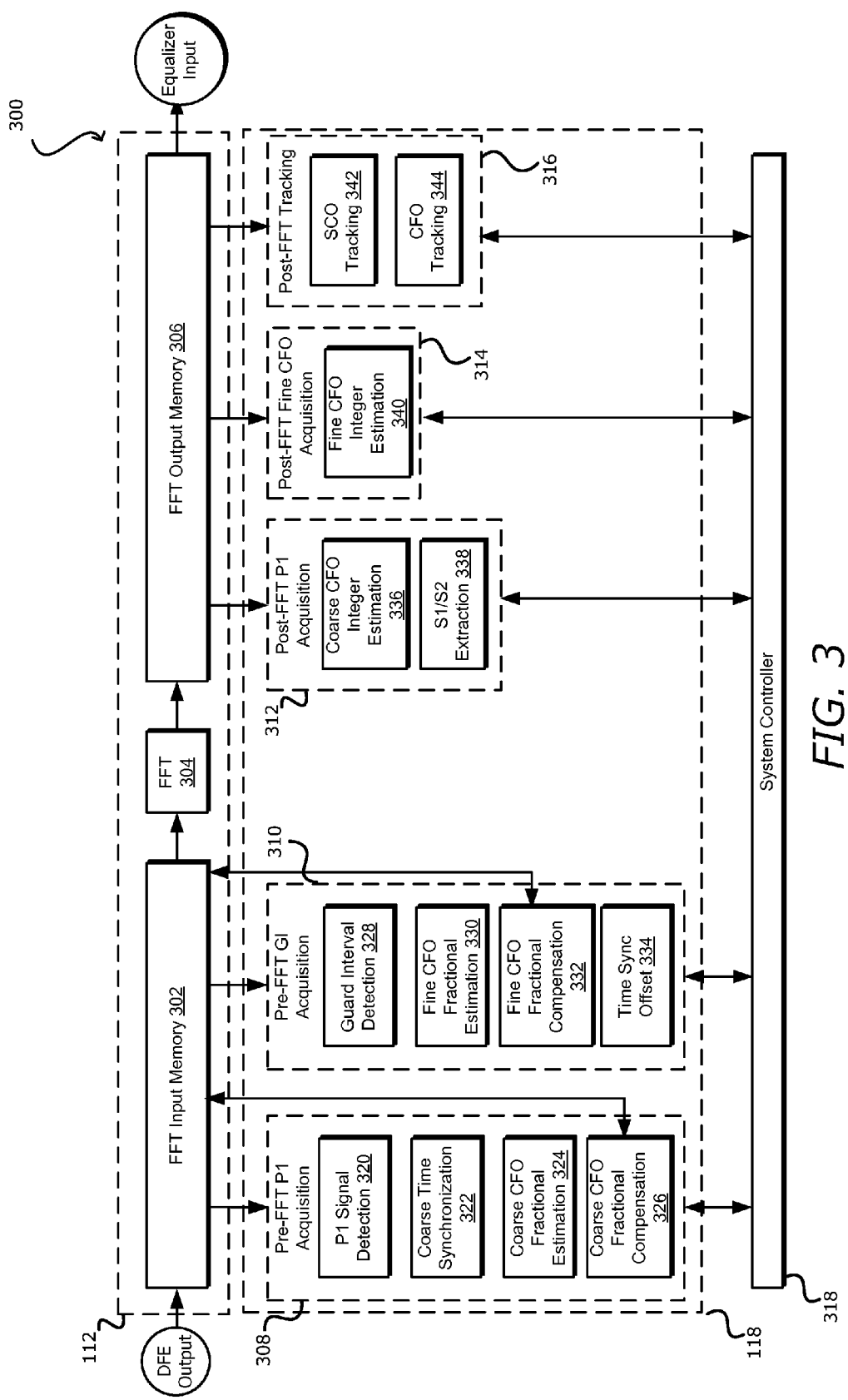
FIG. 3 illustrates an example block diagram of an acquisition and synchronization component of a receiver in accordance with various embodiments.

FIG. 3 illustrates an example block diagram of an acquisition and synchronization component of a receiver in accordance with various embodiments. Before an OFDM symbol can be demodulated, the receiver has to synchronize to both the transmitted frame timing and carrier frequency. First, the receiver has to know where to sample the incoming OFDM symbol prior to FFT process. Second, the receiver has to estimate and correct for any carrier frequency offset. Transmitted signals are provided with timing, frequency, and phase reference parameters to assist with synchronization at the receiver. Proper detection at the receiver requires knowledge of these parameters. A preamble consisting of a sequence of known symbols is used for the receiver. Once the presence of symbol is detected, the next task is to estimate the frequency offset. Frequency offset occurs due to unmatched frequencies on the received signal and the local oscillator at the receiver. Therefore, subcarriers could be shifted from their original positions resulting in a non-orthogonal signal at the receiver.

By estimating the frequency offset at the receiver, the loss in performance due to a frequency mismatch of the received signal and the receiver oscillator can be reduced. The frequency offset estimation techniques can be classified into pilot-aided schemes and non-pilot aided schemes. After normalizing the CFO by the subcarrier spacing, the integer part and the fractional part of the CFO can be estimated separately. Estimation of the integer part of the CFO can be termed as coarse CFO estimation while estimation of the fraction part of the CFO can be termed as fine estimation of the CFO. As shown in FIG. 3, a Fast Fourier Transform (FFT) component (e.g., component 112 of FIG. 1) interacts with an acquisition and synchronization component (e.g., component 118 of FIG. 1). As described, the FFT component computes the Fourier Transform of the signal and the output of the FFT component is provided to the equalizer as well as the acquisition and synchronization component. The acquisition and synchronization component can compensate for time-varying channel effects (e.g., channel distortions), sampling frequency offset errors, and/or carrier frequency offset errors, and compensation values can be provided to the DFE and equalizer. As shown, the FFT component can include a FFT input memory component 302, an FFT algorithm component 304, and a FFT output memory component 306. The FFT input memory component can store an output signal from the DFE that can be used in one or more operations at the acquisition and synchronization component. The FFT algorithm component can store one or more algorithms for computing the FFT of a signal. The FFT output memory component can store an output signal that has undergone an FFT that can be used in operations at the acquisition and synchronization component.

The acquisition and synchronization component can include a pre-processing block and a post processing block. The components in these blocks can communicate using a system controller 318. The pre-processing block is configured to acquire P1 and guard interval (GI) signals. The pre-processing block can include a pre-FFT P1 acquisition component 308 and a pre-FFT G1 acquisition component 310. The pre-FFT P1 acquisition component 308 can include a P1 signal detection component 320, a coarse time synchronization component 322, a coarse CFO fractional estimation component 324, and a coarse fractional compensation component 326. The pre-FFT G1 acquisition component 310 can include a guard interval detection component 328, a fine CFO fractional estimation component 330, a fine CFO fractional compensation component 332, and a time synchronization offset component 334.

The post-processing block is configured to acquire P1, acquire fine CFO, and track result post-FFT. The post-processing block can include a post-FFT P1 acquisition component 312, a post-FFT fine CFO acquisition component 314, and a post-FFT tracking component 316. The post-FFT P1 acquisition component 312 can include a coarse CFO integer estimation component 336 and a S1/S2 extraction component 338. The post-FFT fine CFO acquisition component 314 can include a fine CFO integer estimation component 340. The post-FFT tracking component 316 can include a SCO tracking component 342 and a CFO tracking component 344.

Figure 4A:
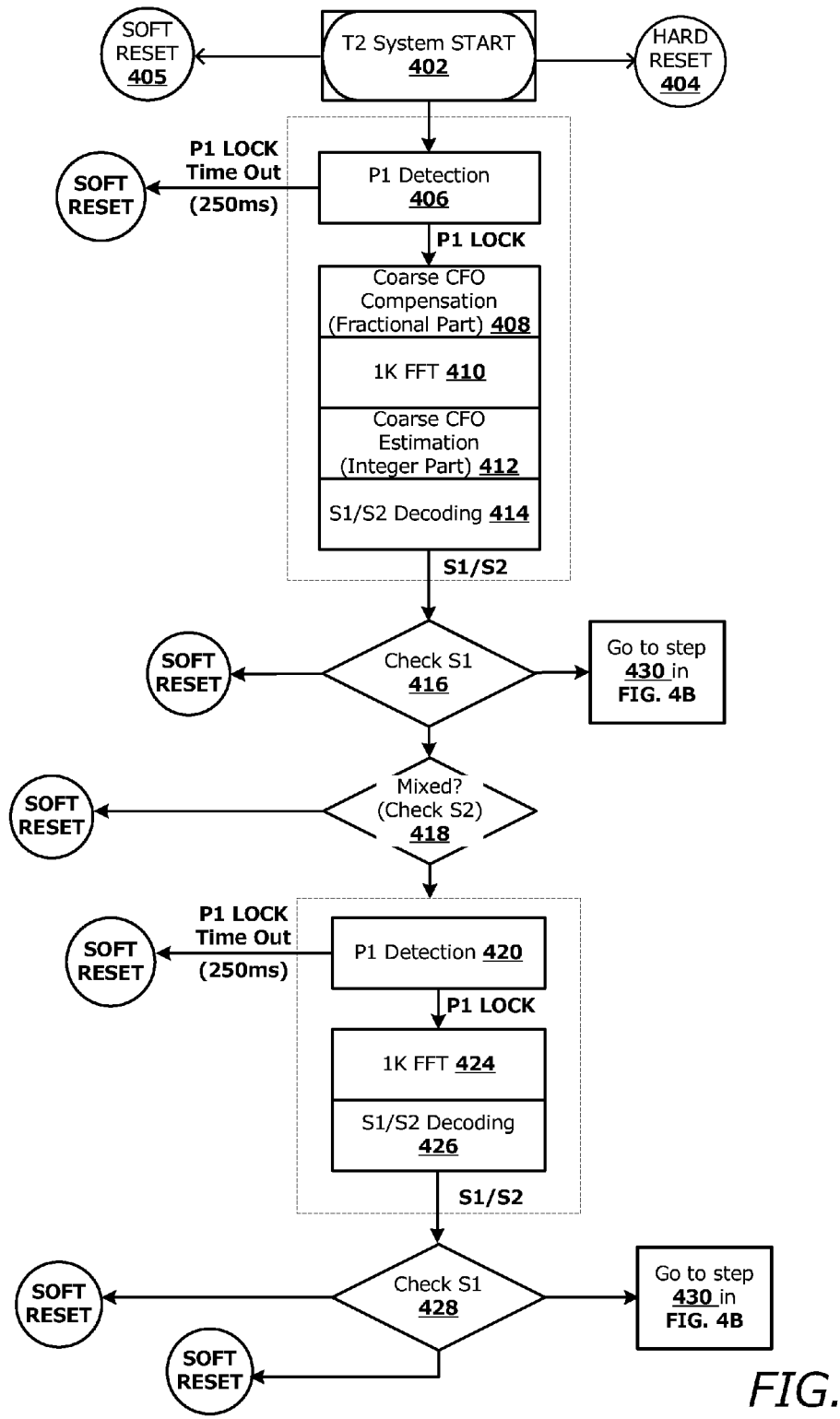
FIGS. 4A, 4B, 4C, and 4D illustrate an example process for acquisition and synchronization of a signal in accordance with various embodiments.

FIGS. 4A, 4B, 4C, and 4D illustrate example processes for acquisition and synchronization of a signal in accordance with various embodiments. It should be understood that, for any process discussed herein, there can be additional, fewer, or alternative steps performed in similar or alternative orders, or in parallel, within the scope of the various embodiments unless otherwise stated. As shown in FIG. 4A, the system beings at step 402. The process can be reset by one of a hard reset 404 or a soft reset 405. At step 406, P1 detection begins on the received signal. P1 detection can be reset by a soft reset, for example, after a timeout of some predetermined period of time. When P1 is not reset, P1 is locked and the system performs at least one of coarse CFO compensation (e.g., fractional part) 408, an FFT 410, coarse CFO estimation (integer part) 412, and S1/S2 decoding on the signal 414. S1 is checked at step 416. If it is determined that S1 is not supported or an error otherwise occurs, a soft reset is performed. If the system determines S1 is of a first result (e.g., T2=SISO), then the process jumps to step 430 in FIG. 4B. If the system determines that 51 is a second result (e.g., 010 FEF), then the process proceeds to check S2. At step 418, the system checks S2 to determine whether S2 is mixed. If an error occurs then a soft reset is performed. If S2 is mixed, then at step 422, P1 detection is performed. If a timeout occurs, a soft reset is performed. If no timeout occurs, then at step 424 a FFT is performed. At step 426, S1/S2 decoding is performed. At step 428, S1 is checked. If an error occurs, then a soft reset is performed. If a first result occurs (e.g., 010 FEF (mixed T2) or where two consecutive FEFs are detected, then a soft reset is performed. If it is determined that T2 is mixed, then the process jumps to step 432 in FIG. 4B.

Figure 4B:
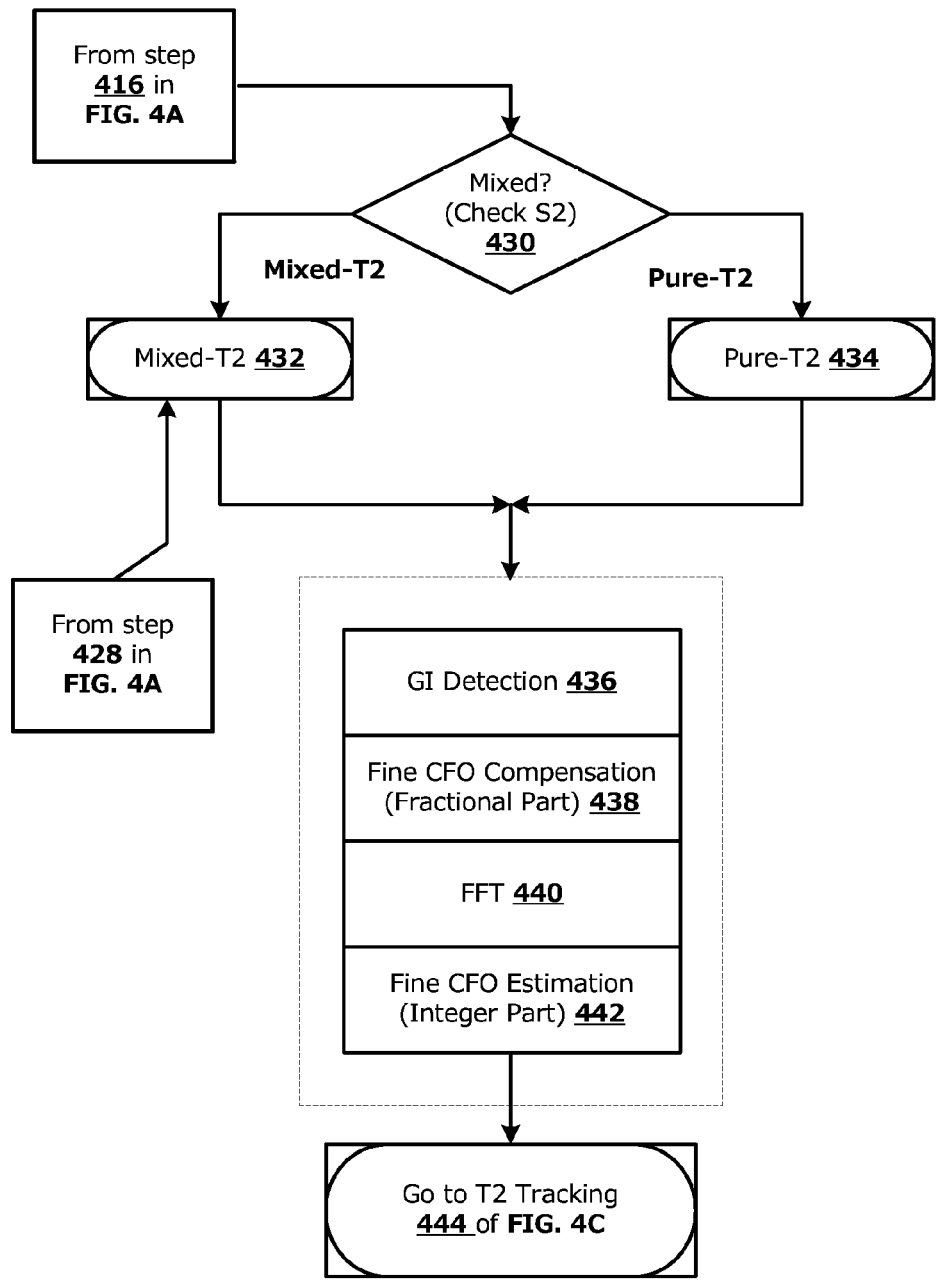
Figure 4C:
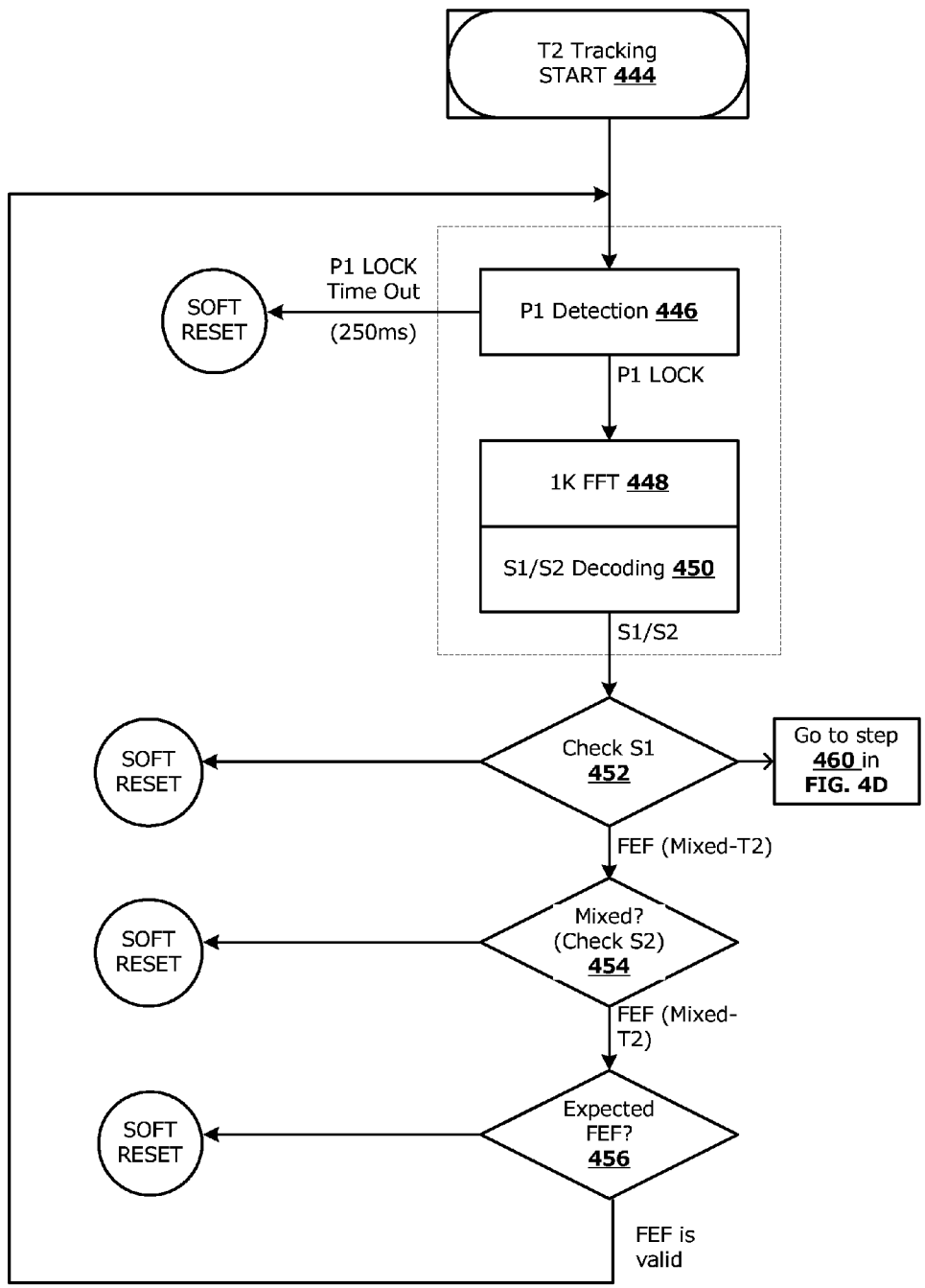

As shown in FIG. 4B, at step 430, the system checks S2 to determine whether the signal is mixed. In this situation, the signal is one of a mixed-T2 signal 432 or a pure-T2 signal 434. In any situation, at step 436, GI detection is preformed, at step 438, fine CFO compensation (fractional part) is pre-formed, at step 440, a FFT is performed, and at step 442, fine CFO estimation (integer part) is performed. At step 444, T2 tracking begins. As shown in FIG. 4C, T2 tracking begins. At step 446, P1 detection begins. If the process times out, then a soft reset occurs. Otherwise, P1 is locked and at step 448, an FFT is performed on the signal. At step 450, S1/S2 decoding is performed. At step 452, S1 is checked. If an error occurs, then a soft reset occurs. If a first result occurs (e.g., T2-SISO) then the system jumps to step 460 in FIG. 4D. Otherwise, at step 454, S2 is checked. If an error occurs when checking S2, then a soft reset occurs. Otherwise, at step 456, the system determines whether FEF is valid. If FEF is valid, then the system repeats at least steps 446, 448, 450, 452, and repeats 454 and 456 if the system does not cause a soft reset to occur or does not jump to step 460 in FIG. 4D.

Figure 4D:
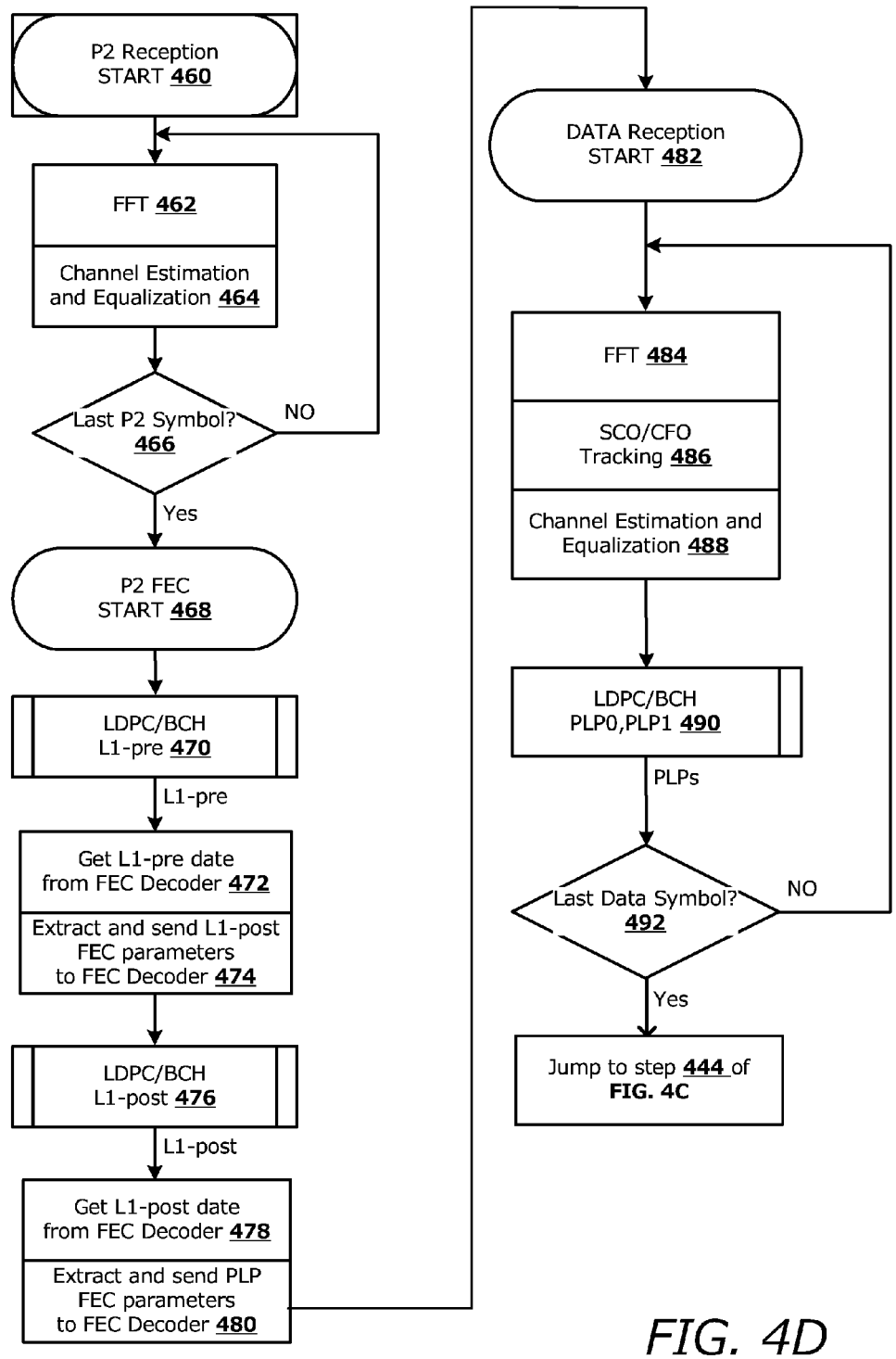

As shown in FIG. 4D, at step 460 P2 reception beings. At step 462, an FFT is performed on the signal. At step 464, channel estimation and equalization is performed. At step 466, it is determined whether the last P2 symbol has been processed. If the last P2 symbol has not been processed, then the process jumps to step 462. If the last P2 symbol has been processed, then at step 468 P2 FEC begins. At step 470, a low-density parity-check (LDPC)/BCH process of the L1-pre is performed. At step 472, the L1-pre date from the FEC is determined. At step 474, the system extracts and sends L1-post FEC parameters to the FEC decoder. At step 476, the LDPC/BCH process for L1-post beings. At step 478, L1-post date from the FEC decoder is determined. At step 480, the system extracts and send PLP FEC parameters to the FEC decoder. At step 482, the data reception process begins. At step 484, a FFT is performed. At step 486, SCO/CFO tracking beings. At step 488, channel estimation and equalization begins. At step 490, the system initiates LDPC/BCH. At step 492, the system determines whether the last data symbol has been processed. If the last data symbol has not been processed, then the system jumps to step 484. If the last data symbol has been processed, then the system jumps to step 444 of FIG. 4C.

Figure 5:
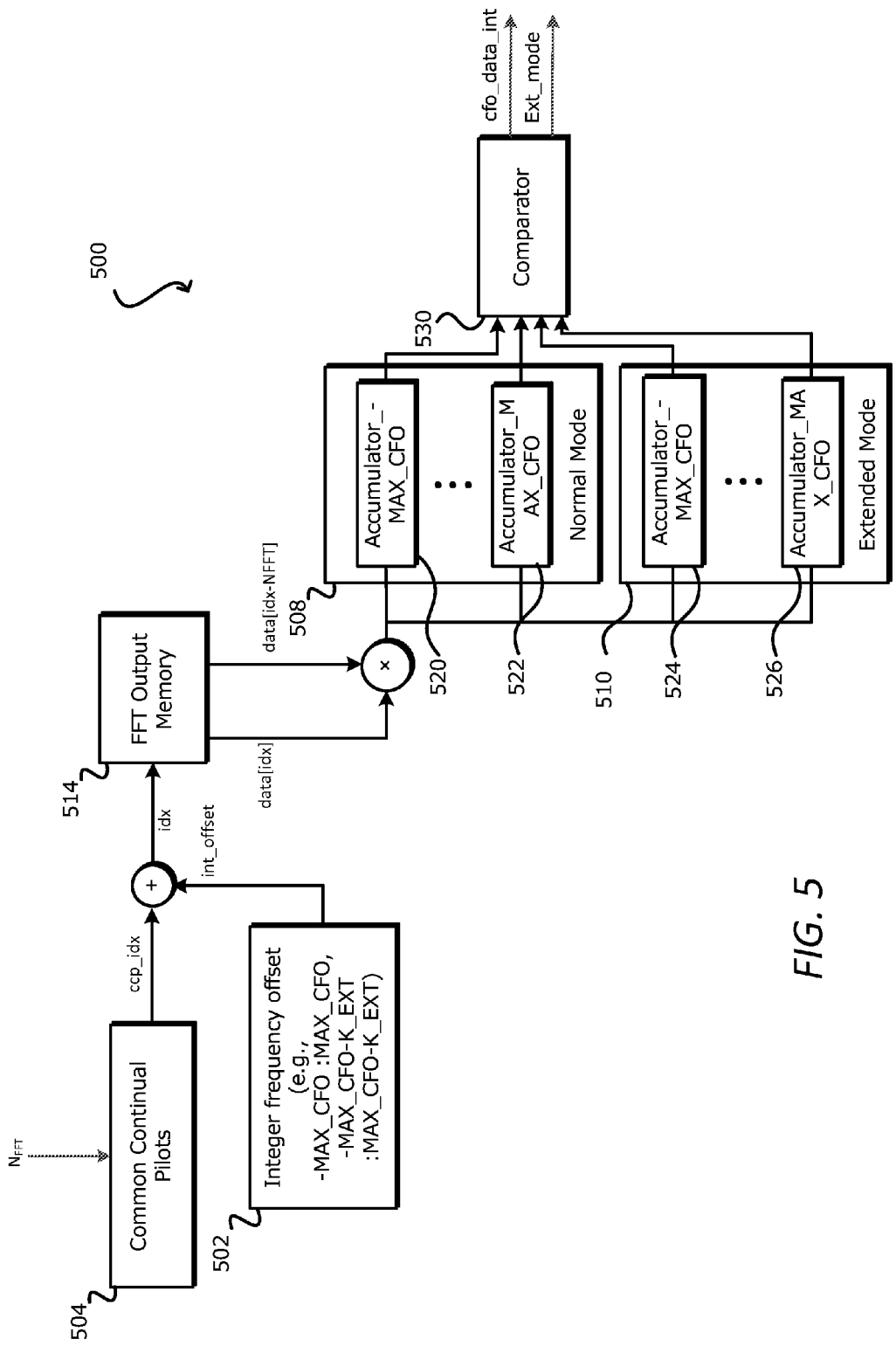
FIG. 5 illustrates an example block diagram of a fine CFO integer estimation component, in accordance with various embodiments.

FIG. 5 illustrates an example block diagram 500 of a fine CFO integer estimation component, such as the one used in component 340 of FIG. 3, in accordance with various embodiments. As described, the acquisition and synchronization component 118 can include a post-FFT fine CFO acquisition component 314 that includes a fine CFO integer estimation 340 component. A pilot pattern can be utilized to cross-correlate an expected location of continual pilots for two consecutive symbols to estimate the integer CFO. In accordance with various embodiments, various cells within the OFDM frame can be modulated with reference information (e.g., pilots) whose transmitted value is known to the receiver. Cells containing reference information are transmitted at "boosted" power level. The information transmitted in these cells can be scattered, continual, edge, P2 or frame-closing pilot cells. The expected location and amplitudes of these pilots are known. The value of the pilot information is derived from a reference sequence, which is a series of values, one for each transmitted carrier on any given symbol. The pilots can be used for frame synchronization, frequency synchronization, time synchronization, channel estimation, transmission mode identification.

In various embodiments, the pilot pattern can be embedded in the P2 data in a DVBT-2 frame. In some situations, this may require an integer frequency offset 502 to be known. Accordingly, the integer frequency offset value can be estimated from P1 data (e.g., MAX_CFO: MAX_CFO, −MAX_CFO-K_EXT:MAX_CFO-K_EXT) but often may not be sufficiently accurate, especially for larger FFT sizes (16 k and 32 k).

In accordance with various embodiments, there can exist a subset of the continual pilots common to all pilot patterns for each FFT size. These "common continual pilots" 504 can be used to reliably estimate the integer CFO and find the carrier bandwidth being used (normal mode 508 or extended mode 510). Accordingly, the fine CFO integer estimation algorithm can estimate the integer carrier offset using consecutive data symbols. The algorithm can be based on finding the continual pilot carrier locations in consecutive OFDM symbols. In accordance with various embodiments, there are a set of common pilots across all pilot patterns for each FFT size and these pilots can be used in the algorithm.

In various embodiments, the below algorithm can cross-correlate two consecutive symbols at the expected continual pilot locations in the following way:

$$FineCfoInt_l = \arg\max_k \sum_{i \in \{CP_{IDX}\}} |real(data\_fft_{l,i+k} \times data^*_{fft_{l-1,i+k}})| + |imag(data\_fft_{l,i+k} \times data^*_{fft_{l-1,i+k}})|$$

The index k is over the range {−MAX_CFO:MAX_CFO}, and {CP_IDX} is the set of common pilots across all pilot patterns for the corresponding FFT size. In various embodiments, P1 estimation and decoding can be used to determine an estimate for the integer and fractional CFO within 0.1 subcarriers in 1 k mode. This can correspond to >0.5 subcarriers in 8 k, 16 k, and 32 k modes, and as such, so this algorithm is used in these modes. In accordance with various embodiments, assuming a reliable P1 estimate, the following values for MAX_CFO can be used: for 8 k mode, MAX_CFO=1, for 16 k mode, MAX_CFO=2, and for 32 k mode, MAX_CFO=3.

Two internal registers (508 and 510) can be used to track the correlation values across symbols. A first registry can be used in a normal mode and a second registry can be used in an extended mode. Since extended mode has more carriers than normal mode, the offset for the two modes is different. As such, the {CP_IDX} should have a different offset for the two modes. Each of these registers spans the search range, so they can be of size (2*MAX_CFO+1). The above sum operation is performed on the complex values in data__ft. This data comes from the FFT block 514 and is sent to a delay block, after which consecutive symbols are multiplied together. The output of the multiplier is sent into a set of accumulators (520, 522, 524, 526) with an enable signal based on the symbol index. The above sum is then calculated and stored in an array, depending on the index. There is one array for normal mode, accumValsNorm, and one for extended mode, accumValsExt.

Once these values have all been calculated, k is initialized to −MAX_CFO and the magnitude of each element is sequentially calculated and stored in tmpVal. The results are then compared in an comparator 530. In accordance with various embodiments, if tmpVal>max_val, then max_val is set to tmpVal and fineCfoInt is set to k. The field Ext_mode is set to 0 if max_val is from accumValsNorm and to 1 if max_val is from accumValsExt. Then, k=k+1. This loop is run until k=MAX_CFO for each mode (normal and extended). The outputs are FineCfoInt and Ext_mode.

In accordance with various embodiments, a coarse CFO integer estimation component can estimate the integer carrier offset using P1 data. As described, acquisition and synchronization component 118 can include post-FFT P1 acquisition component 312 that includes coarse CFO integer estimation 336 component. The coarse CFO estimation algorithm can be based at least in part on finding the active carrier locations in the P1 orthogonal frequency-division multiplexing (OFDM) symbol. The active carriers occupy 384 of the 1024 subcarriers in an OFDM symbol. The locations of these 384 subcarriers with no offset are given by the DVB-T2 standard, and are the same for every T2 frame. In various embodiments, the magnitude of the 384 active carriers can consist of the noise and the data, while the magnitude of the non-active carriers can consist of just the noise. The below algorithm can calculate the sum of the magnitude of the expected locations of the 384 carriers over a search range:

$$\text{CoarseCfoInt} = \arg\max_k \Sigma_{i \in \{AC\_IDX\}} |\text{real}(\text{data\_p1\_fft}_{i+k})| + |\text{imag}(\text{data\_p1\_fft}_{i+k})|$$

The index k is over the range {-MAX_CFO:MAX_CFO}, and {AC_IDX} is the set of active carrier locations with 0 carrier integer offset. For a 500 kHz max offset and a 5 MHz channel bandwidth, the value of MAX_CFO can be 1024*(500 kHz)/(8/7*5 MHz))=90 subcarriers. In various embodiments, this value can be adjusted for larger/smaller max frequency offsets.

The below algorithm (i.e., cfo_p1_int) can estimate the integer carrier offset using the P1 data. The algorithm can be based on finding the active carrier locations in the P1 OFDM symbol. The active carriers occupy 384 of the 1024 subcarriers in the OFDM symbol. The locations of these 384 subcarriers with no offset can be determined by the DVB-T2 standard and are the same for every T2 frame. The magnitude of the 384 active carriers can consist of the noise and the data, while the magnitude of the non-active carriers can consist of just the noise. Thus, the algorithm can calculate the sum of the magnitude of the expected locations of the 384 carriers over a search range:

$$cfo\_p1\_int = \arg\max_k \Sigma_{i \in \{carr\_loc\}} |\text{real}(\text{data\_p1\_fft}_{i+k})| + |\text{imag}(\text{data\_p1\_fft}_{i+k})|$$

The index k is over the range {-search_range: search_range}, and {carr_loc} is the set of carrier locations with 0 carrier integer offset. In accordance with an embodiment, for a 500 kHz max offset and a 8/7*8 MHz sampling frequency, the search range should be 1024*(500 kHz)/(8/7*8 MHz)=56 subcarriers. This value can be adjusted for larger/smaller max frequency offsets.

Figure 6A:
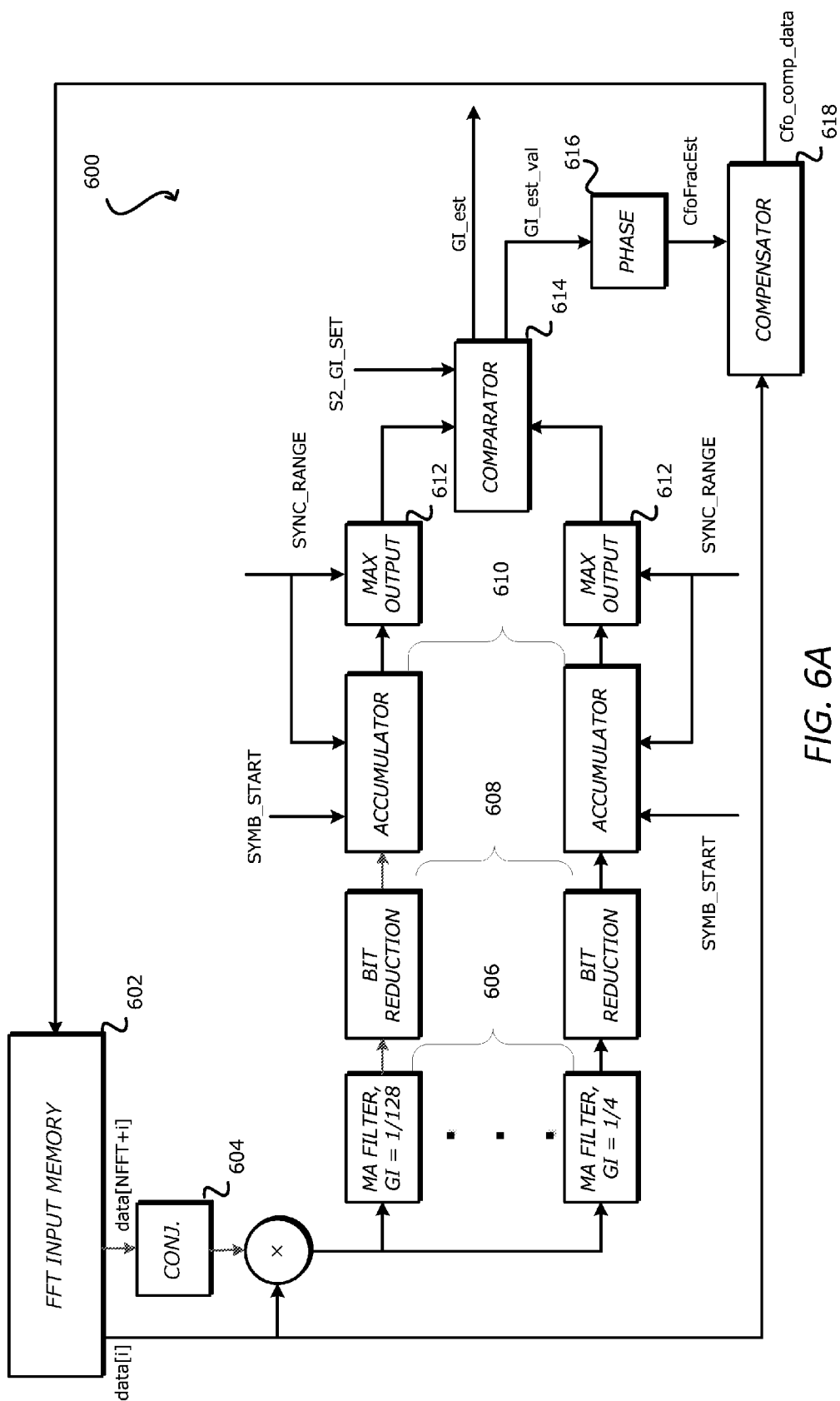
FIGS. 6A and 6B illustrate example block diagrams of a guard interval detection component, in accordance with various embodiments.
Figure 6B:
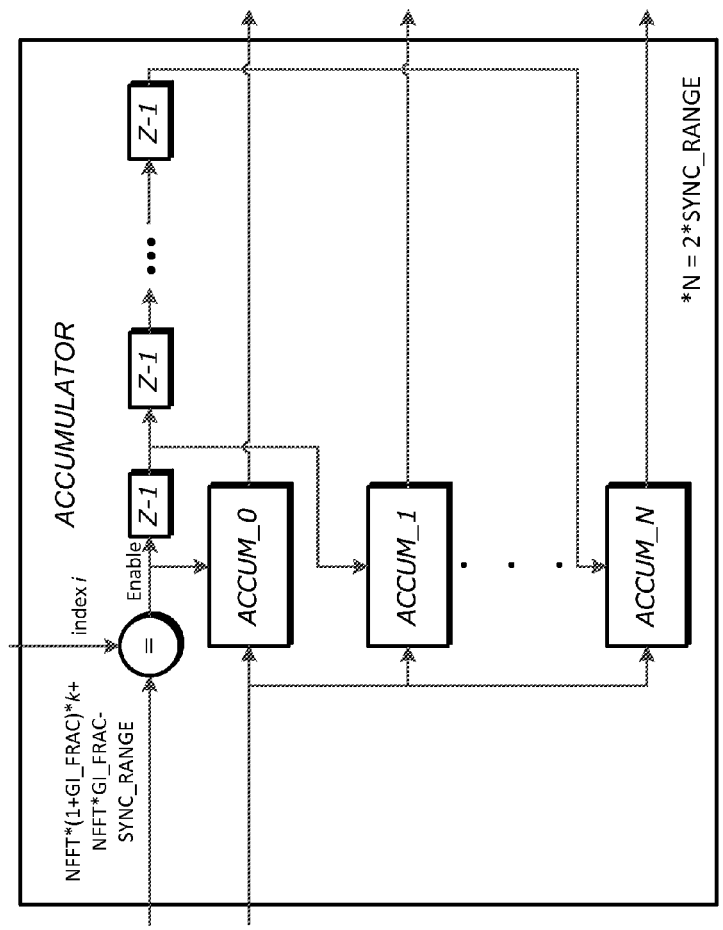

FIGS. 6A and 6B illustrate example block diagrams 600 and 660 of a guard interval detection component, such as one used in component 328 of FIG. 3, in accordance with various embodiments. The guard interval detection component can estimate the guard interval size and the fractional carrier frequency offset based on the repetition of the guard interval in the signal. The guard interval algorithm can cross-correlate the signal at index i with the signal at $N_{FFT}$+i. The result is then accumulated over many symbols and compared to each other over a search range. The search range is dependent on the accuracy of the coarse time sync from the P1 symbol. The maximum accumulated value, normalized by the guard interval size, gives the estimated guard interval.

The guard interval algorithm can take input from the pre-FFT data stored in FFT input memory 602. The input from the pre-FFT data is delayed by delay component 604 by the FFT size and cross-multiplied. The result of the multiplier can be provided to a set of moving-average filters 606, one for each GI size. The results of these filters can be reduced using a bit reduction component 608 provided to an accumulator 610, which sums the result from the MA filter at every symbol index. As shown in FIG. 6B, the accumulator calculates and stores the accumulated values from all possible time syncs, so the size of the accumulated values to be stored is given by 2*SYNC_RANGE+1. In accordance with an embodiment, the SYNC_RANGE is a function of the potential guard interval size and the FFT size. In various embodiments, the SYNC_RANGE does exceed half of the potential guard interval size. The accumulator has an input SYMB_START, which can be used as a control to the accumulator to determine which symbol to begin accumulation from. In some embodiments, the first few symbols may be more unreliable than later symbols, so typically SYMB_START>0.

Returning to FIG. 6A, assuming a 16-bit input from the FFT input memory, the output from the multiplier is 32 bits (signed). In various embodiments, due to the size of the output from the multiplier, the output can be reduced to 14 bits. The output of the accumulator 612 is processed to be 16 bits as well. The result of the accumulator is provided to a comparator ("Max Output") that outputs the maximum value of all the accumulated values. This max is taken by taking the magnitude of the result from the accumulator.

In accordance with various embodiments, the maximum value for each guard interval size is provided to another comparator 614; wherein the result of the final comparator provides the estimated guard interval size. The index from the "Max Output" block of the max gives an estimate for timing synchronization. In certain embodiments, the FFT size and S2 field from P1 are able to eliminate some guard interval possibilities, so the result from all the filters is not necessary for comparison. To determine an estimate for the CFO fractional offset, the phase of the maximum value of the comparator is determined using a phase determining component 616. This offset is used to correct the current data using compensator 618 to be fed into the FFT for integer estimation.

Figure 7:
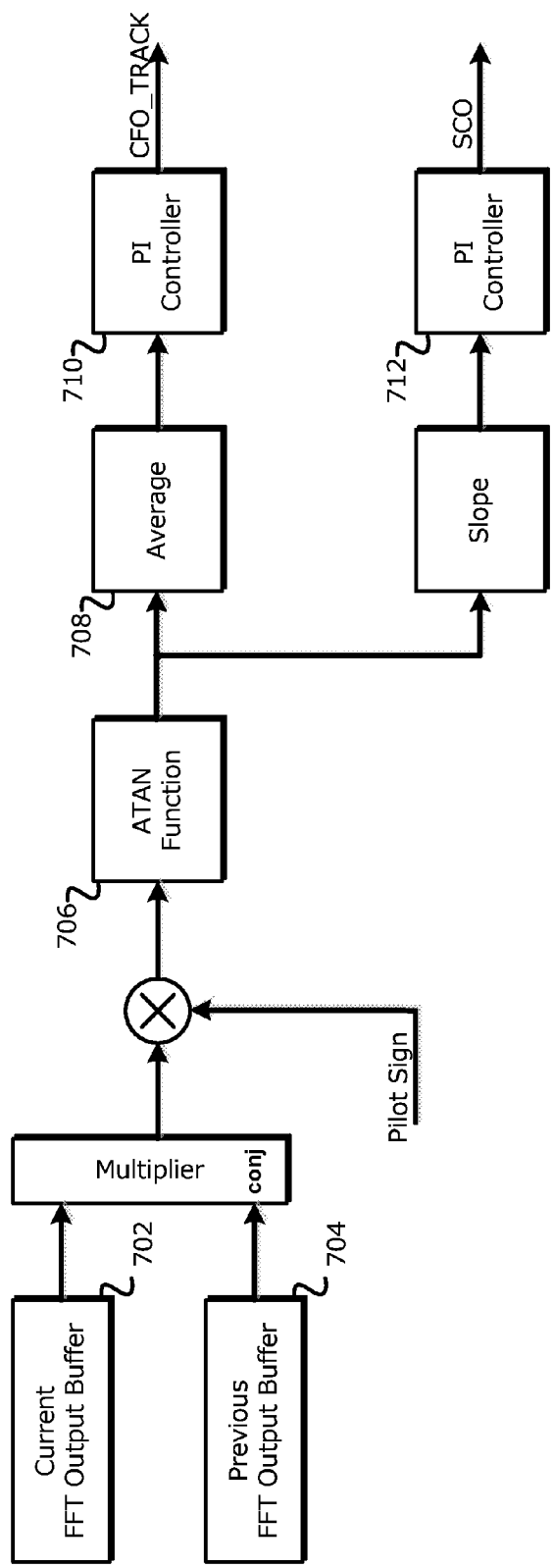
FIG. 7 illustrates an example block diagram for SCO/CFO tracking, in accordance with various embodiments.

FIG. 7 illustrates an example block diagram 700 for SCO/CFO tracking, such as used in components 342 and 344 of FIG. 3, in accordance with various embodiments. In accordance with various embodiments, the SCO/CFO tracking algorithm can estimate the fractional carrier frequency offset (CFO) and the sampling clock offset (SCO) during the tracking phase of the receiver operation. The block takes as its main input the symbols from the current FFT output buffer 702 and the previous symbols from the FFT output buffer 704 for its calculations. The calculations for both rely on the phase of the continual pilots between the current and previous OFDM symbols. The phase can be calculated as:

$$\text{phase}(k) = \text{atan}\left(\frac{\text{imag}(x(k) * x^*(k - NFFT)) * \text{sign}(k)}{\text{real}(x(k) * x^*(k - NFFT)) * \text{sign}(k)}\right),$$

$$k \in \{CP \text{ locations}\}$$

where, sign(k) is the sign difference between the successive OFDM symbols. The CFO estimate can be determined by the average of the calculated phases. The CFO estimate can be provided to a proportional-integral (PI) filter. The SCO estimate can be calculated as:

$$SCO \text{ estimate} = \frac{avg_{k \in \{CP \text{ locations}\}} k * \text{phase}(k) - avg_{k \in \{CP \text{ locations}\}} k * avg_{k \in \{CP \text{ locations}\}} \text{phase}(k)}{[avg_{k \in \{CP \text{ locations}\}} k^2 - (avg_{k \in \{CP \text{ locations}\}} k)^2] * (1 + GI\_est)}$$

This estimate is also passed through a PI filter to determine the final SCO estimate. In accordance with various embodiments, first an ATAN function 706 (can be implemented using a CORDIC) can be used on the continual pilot locations in each OFDM symbol to calculate the phase. The block should have at least two static variables to keep track of the current values of the CFO and SCO. The CFO estimate for the current symbol is the average 708 of the phases in the continual pilot symbols. This estimate is then provided into a 710 PI loop with $kp_{CFO}$ and $ki_{CFO}$ being the proportional and integral coefficients, respectively. The final CFO estimate is determined by the output of the PI loop. The SCO estimate for the current symbol is determined by the equation above. The output of this computation is changed to a 16-bit signed value and then provided into a PI loop 712 with $kp_{SCO}$ and $ki_{SCO}$ being the proportional and integral coefficients, respectively. The final SCO estimate is given by the output of the PI loop.

Various embodiments discussed or suggested herein may be conveniently implemented using a conventional general purpose or a specialized digital computer or microprocessor programmed according to the teachings of the present disclosure. These devices also can include other electronic devices, such as dummy terminals, thin-clients, gaming systems, and other devices capable of communicating via a network. Appropriate software coding can readily be prepared by skilled programmers based on the teachings of the present disclosure, as will be apparent to those skilled in the software art.

Most embodiments utilize at least one network that would be familiar to those skilled in the art for supporting communications using any of a variety of commercially-available protocols, such as TCP/IP, FTP, UPnP, NFS, CIFS and the like. The network can be, for example, a local area network, a wide-area network, a virtual private network, the Internet, an intranet, an extranet, a public switched telephone network, an infrared network, a wireless network, and any combination thereof.

Such devices also can include a computer-readable storage media having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. The computer-readable storage media can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed. Based on the disclosure and teachings provided herein, a person of ordinary skill in the art will appreciate other ways and/or methods to implement the various embodiments.

The foregoing description of embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A method, comprising:
   receiving an orthogonal frequency-division multiplexing (OFDM) transmission;
   analyzing a first portion of the OFDM transmission, the first portion including at least a fixed pilot symbol that carries signaling fields including one or more transmission parameters;
   determining a coarse carrier frequency offset (CFO) fractional compensation of the OFDM transmission based at least in part on the first portion of the OFDM transmission;
   determining a guard interval of the OFDM transmission;
   determining, based at least in part on the guard interval, a fine CFO fractional compensation of the OFDM transmission;
   performing a Fast Fourier transform (FFT) of the OFDM transmission based at least in part on the CFO fractional compensation and the fine CFO fractional compensation; and
   tracking at least one of a sampling clock offset (SCO) or a CFO based at least in part on the FFT of the OFDM transmission, wherein at least one of the SCO or the CFO is configured to synchronize at least a portion of a receiver, wherein tracking the CFO further includes:
      determining a conjugate product of a first FFT output and a second FFT output of the OFDM transmission, the first FFT output and the second FFT output including one of a plurality of OFDM symbols of the OFDM transmission;
      determining a phase of the product of the first FFT output and the second FFT output and
      determining an average of the phase of subsequent products of the plurality of OFDM symbols with the phase of the product of the first FFT output and the second FFT output.

2. The method of claim 1, wherein determining the coarse CFO fractional compensation further includes:
   determining a coarse time synchronization of the OFDM transmission; and
   determining a coarse CFO fractional estimation of the OFDM transmission.

3. The method of claim 2, wherein determining the coarse time synchronization includes determining a position of a first sample of the guard interval.

4. The method of claim 2, wherein determining the coarse CFO fractional estimation of the OFDM transmission further includes:
   determining active carrier locations in the first portion of the OFDM transmission.

5. The method of claim 1, further including:
   determining a coarse CFO integer estimation of the OFDM transmission; and
   determining, based at least in part on the coarse CFO integer estimation, a first signaling field and a second signaling field of the OFDM transmission.

6. The method of claim 1, wherein the OFDM transmission is received from a digital front-end (DFE) component, the DFE component configured to perform at least one of filter adjacent radio frequency (RF) channels, recover in-phase quadrature (IQ) imbalances, perform CFO compensation, perform SCO compensation, or down convert a signal from a low-intermediate frequency (IF) to baseband zero-IF.

7. The method of claim 1, further including:
determining a fine CFO integer estimation of the OFDM transmission at least in response to performing an FFT of the OFDM transmission.

8. The method of claim 7, wherein determining the fine CFO integer estimation further includes:
cross-correlating common continual pilots in different pilot patterns of the OFDM transmission with an expected location of continual pilot symbols of the OFDM transmission.

9. The method of claim 1, wherein determining the guard interval further includes:
cross-correlating the OFDM transmission at a first index to the OFDM transmission at a second index;
accumulating one or more symbols of the OFDM transmission over a search range to determine a maximum accumulated value; and
normalizing the maximum accumulated value.

10. A receiver, comprising:
a transmission synchronization component;
at least one computing device processor;
a memory device including instructions that, when executed by the at least one computing device processor, enable the receiver to:
receive an OFDM transmission that includes a plurality of OFDM symbols;
analyze a first portion of the OFDM transmission, the first portion including at least a fixed pilot symbol that carries signaling fields;
determine a carrier frequency offset (CFO) fractional compensation of the OFDM transmission based at least in part on the first portion of the OFDM transmission;
determine a guard interval of the OFDM transmission;
determine, based at least in part on the guard interval, a fine CFO fractional compensation of the OFDM transmission;
perform a Fast Fourier transform (FFT) of the OFDM transmission based at least in part on the CFO fractional compensation and the fine CFO fractional compensation; and
track, at least one of a sampling clock offset (SCO) or CFO based at least in part on the FFT of the OFDM transmission, wherein at least one of the SCO or the CFO is configured to synchronize at least a portion of a receiver, wherein track the CFO further includes:
determine a conjugate product of a first FFT output and a second FFT output of the OFDM transmission, the first FFT output and the second FFT output including one of a plurality of OFDM symbols of the OFDM transmission;
determine a phase of the product of the first FFT output and the second FFT output and
determine an average of the phase of subsequent products of the plurality of OFDM symbols with the phase of the product of the first FFT output and the second FFT output.

11. The receiver of claim 10, wherein the OFDM transmission is received from a digital front-end (DFE) component, and wherein the DFE component includes:

an intermediate frequency (IF) down-converter component configured to down convert a frequency of the OFDM transmission;
an in-phase quadrature (IQ) imbalance recovery component is configured to compensate for an IQ mismatch;
a CFO compensator component configured to compensate the OFDM transmission;
a digital filter configured to filter at least one adjacent channel signal of the OFDM transmission; and
a sampling clock offset (SCO) compensator configured to adjust a sampling rate between an analog-to-digital converter (ACD) in the receiver and a digital-to-analog converter (DAC) in a transmitter of the OFDM transmission,
wherein the IF down-converter component is connected to the IQ imbalance recovery component, the IF down-converter component and the IQ imbalance recovery component are connected to the CFO compensator component, the CFO compensator component is connected to the digital filter, and the digital filter is connected to the SCO compensator.

12. The receiver of claim 11, wherein the CFO compensator component is a digital mixer that is implemented using a coordinate rotation digital computer (CORDIC) algorithm.

13. The receiver of claim 10, further including a coarse CFO fractional compensation component configured to:
determine a coarse time synchronization of the OFDM transmission; and
determine a coarse CFO fractional estimation of the OFDM transmission.

14. The receiver of claim 10, further comprising:
a fine CFO integer estimation component configured to cross-correlate at least one pilot pattern of the OFDM transmission with an expected location of continual pilot symbols of the OFDM transmission.

15. The receiver of claim 10, further comprising a guard interval detection component configured to:
cross-correlate the OFDM transmission with itself with delay depth of all possible FFT sizes;
accumulate the cross-correlation result using different moving average filters with the same size of all possible guard-interval sizes;
accumulate moving average results over a predetermined number of OFDM symbols to determine a gain for the correct FFT and guard interval sizes; and
compare an output of a last accumulators to determine a guard-interval size and a FFT size.

16. A non-transitory computer readable storage medium storing one or more sequences of instructions executable by one or more processors to perform a set of operations comprising:
receiving an OFDM transmission that includes a plurality of OFDM symbols;
analyzing a first portion of the OFDM transmission, the first portion including at least a fixed pilot symbol that carries signaling fields;
determining a carrier frequency offset (CFO) fractional compensation of the OFDM transmission based at least in part on the first portion of the OFDM transmission;
determining a guard interval of the OFDM transmission;
determining, based at least in part on the guard interval, a fine CFO fractional compensation of the OFDM transmission;
performing a Fast Fourier transform (FFT) of the OFDM transmission based at least in part on the CFO fractional compensation and the fine CFO fractional compensation; and tracking, at least one of a sampling clock offset (SCO) or CFO based at least in part on the FFT of the OFDM transmission, wherein at least one of the SCO or the CFO is configured to synchronize at least a portion of a receiver, wherein tracking the CFO further includes:
   determining a conjugate product of a first FFT output and a second FFT output of the OFDM transmission, the first FFT output and the second FFT output including one of a plurality of OFDM symbols of the OFDM transmission;
   determining a phase of the product of the first FFT output and the second FFT output and
   determining an average of the phase of subsequent products of the plurality of OFDM symbols with the phase of the product of the first FFT output and the second FFT output.

17. The non-transitory computer readable storage medium of claim 16, further comprising instructions executed by the one or more processors to perform the operations of:
   determining a coarse time synchronization of the OFDM transmission; and
   determining a coarse CFO fractional estimation of the OFDM transmission.

18. The non-transitory computer readable storage medium of claim 17, wherein the instructions, when executed by the one or more processors to determine the coarse CFO fractional compensation, further perform the operations of at least one of determining a position of a first sample of the guard interval or determining active carrier locations in the first portion of the OFDM transmission.

19. The non-transitory computer readable storage medium of claim 17, further comprising instructions executed by the one or more processors to perform the operations of:
   determining a coarse CFO integer estimation of the OFDM transmission; and
   determining, based at least in part on the coarse CFO integer estimation, a first signaling field and a second signaling field of the OFDM transmission.

20. The receiver of claim 11, wherein determine the coarse CFO fractional compensation further includes:
   determine a coarse time synchronization of the OFDM transmission; and
   determine a coarse CFO fractional estimation of the OFDM transmission.

* * * * *